US012564993B2

(12) United States Patent
Beyrer et al.

(10) Patent No.: US 12,564,993 B2
(45) Date of Patent: Mar. 3, 2026

(54) NOZZLE FOR EXTRUDING A MATERIAL RICH IN PROTEIN AND WATER, AS WELL AS AN EXTRUSION MACHINE COMPRISING SUCH A NOZZLE

(71) Applicant: CLEXTRAL, Firminy (FR)

(72) Inventors: Michael Beyrer, Sierre/Siders (CH); Christian Cachelin, Saviese (CH); Laurent Rapillard, Conthey (CH)

(73) Assignee: CLEXTRAL, Firminy (FR)

( * ) Notice: Subject to any disclaimer, the term of this patent is extended or adjusted under 35 U.S.C. 154(b) by 639 days.

(21) Appl. No.: 18/017,042

(22) PCT Filed: Jul. 20, 2021

(86) PCT No.: PCT/EP2021/070271
§ 371 (c)(1),
(2) Date: Jan. 19, 2023

(87) PCT Pub. No.: WO2022/018084
PCT Pub. Date: Jan. 27, 2022

(65) Prior Publication Data
US 2024/0009909 A1     Jan. 11, 2024

(30) Foreign Application Priority Data

Jul. 21, 2020    (FR) ...................................... 2007642

(51) Int. Cl.
*A23P 30/20* (2016.01)
*B29C 48/33* (2019.01)
(Continued)

(52) U.S. Cl.
CPC .............. *B29C 48/33* (2019.02); *A23P 30/20* (2016.08); *B29C 48/40* (2019.02); *B29C 48/873* (2019.02)

(58) Field of Classification Search
CPC ....... B29C 48/33; B29C 48/873; B29C 48/40; A23P 30/20; A23J 3/26
(Continued)

(56) References Cited

U.S. PATENT DOCUMENTS 2,919,467 A     1/1960 Mercer
6,016,742 A *   1/2000 Hauck ..................... A23P 30/20
                                                           425/464
(Continued)

FOREIGN PATENT DOCUMENTS

DE          6806402          9/1972
EP          0 213 204        3/1987
(Continued)

OTHER PUBLICATIONS

International Search Report for PCT/EP2021/070271, dated Oct. 19, 2021, 6 pages.
(Continued)

*Primary Examiner* — Jacob K Ackun
(74) *Attorney, Agent, or Firm* — NIXON & VANDERHYE

(57)     ABSTRACT

A nozzle includes a tubular, temperature-controlled outer casing, centered on an axis. For a more compact and efficient design, the nozzle also includes an inner member coaxially arranged inside the outer casing and mounted rotatably about the axis relative to the outer casing, such that a downstream portion of the inner member extends outside the outer casing and engages with a drive motor to rotate about the axis, and such that a channel having an annular cross section and centered on the axis is defined between the outer casing and the inner member. The channel has an upstream end and a downstream end between which the material flows into the channel when it is pushed through the nozzle such that, when the material is pushed through the nozzle, the
(Continued)

material moves through the channel from the upstream end to the downstream end whereby the material axially exits the channel.

20 Claims, 5 Drawing Sheets

(51) Int. Cl.
  *B29C 48/40* (2019.01)
  *B29C 48/86* (2019.01)

(58) Field of Classification Search
  USPC .................................................... 99/353, 348
  See application file for complete search history.

(56) References Cited

U.S. PATENT DOCUMENTS

| | | | | |
|---|---|---|---|---|
| 7,879,380 | B1* | 2/2011 | Radatti | A21B 5/023 |
| | | | | 426/514 |
| 8,322,272 | B1* | 12/2012 | Wenger | B01F 27/0724 |
| | | | | 366/85 |
| 2003/0091710 | A1 | 5/2003 | Bajema | |
| 2008/0160157 | A1* | 7/2008 | Rutishauser | B29C 48/57 |
| | | | | 99/485 |
| 2010/0104691 | A1* | 4/2010 | Bouvier | A21D 8/02 |
| | | | | 426/19 |
| 2012/0037010 | A1* | 2/2012 | Powers | A23L 13/60 |
| | | | | 99/355 |
| 2013/0059053 | A1* | 3/2013 | Wenger | B29C 48/395 |
| | | | | 99/353 |
| 2016/0037803 | A1* | 2/2016 | Tumagyan | B29C 48/686 |
| | | | | 426/11 |
| 2018/0098557 | A1 | 4/2018 | Walther et al. | |
| 2018/0271108 | A1 | 9/2018 | Jørgensen et al. | |
| 2021/0046690 | A1 | 2/2021 | Klein et al. | |
| 2024/0341343 | A1* | 10/2024 | Danos | A23P 30/20 |
| 2025/0194637 | A1* | 6/2025 | Mitchell | A23J 3/227 |

FOREIGN PATENT DOCUMENTS

| | | |
|---|---|---|
| EP | 3524059 A1 | 8/2019 |
| FR | 2 213 846 | 8/1974 |
| JP | 2002-113764 | 4/2002 |
| KR | 10-0982950 | 9/2010 |
| WO | 03/007729 | 1/2003 |
| WO | 2017/050811 | 3/2017 |
| WO | 2020/144407 | 7/2020 |
| WO | 2021136816 A1 | 7/2021 |

OTHER PUBLICATIONS

Written Opinion of the ISA for PCT/EP2021/070271, dated Oct. 19, 2021, 7 pages.
French Search Report for FR2007642, dated Mar. 31, 2021, 2 pages.
World Intellectual Property Organization (WIPO). "Conic Closed Revolution Modular Short Coat Hanger Die." European Patent Application EP 19220004.6. Priority Filing Date Dec. 30, 2019. Document Made Available Under the Patent Cooperation Treaty (PCT).

* cited by examiner

NOZZLE FOR EXTRUDING A MATERIAL RICH IN PROTEIN AND WATER, AS WELL AS AN EXTRUSION MACHINE COMPRISING SUCH A NOZZLE

CROSS-REFERENCE TO RELATED APPLICATION(S)

This application is the U.S. national phase of International Application No. PCT/EP2021/070271 filed Jul. 20, 2021 which designated the U.S. and claims priority to FR 2007642 filed Jul. 21, 2020, the entire contents of each of which are hereby incorporated by reference.

BACKGROUND OF THE INVENTION

Field of the Invention

The present invention relates to a nozzle for extruding a material rich in protein and water. The invention further relates to an extrusion machine including such a nozzle. The invention further relates to a system for continuous preparation of an extruded food product.

Description of the Related Art

The invention addresses extrusion machines which include a sleeve inside which, one or a plurality of screws, in particular two screws, are rotated on themselves so that the screws pull along a material to be extruded from an upstream part of the sleeve to the downstream end of the sleeve where the material is then forced to flow through an extrusion nozzle, provided for shaping, texturing and/or fibrating the extruded material. Such an extrusion machine applies a thermo-mechanical treatment to the material, in the sense that the material undergoes both an essentially mechanical transformation, through pressurization and through shearing by the screws, and an essentially heat transformation, through temperature regulation along the sleeve.

More specifically, the invention relates to the extrusion of materials rich in proteins and in water, and the associated food-processing extrusion machines for continuously preparing a textured food product from a raw material rich in proteins. The proteins of the raw material can be, in particular, of animal and/or plant origin. In all cases, the proteins are mixed with a large proportion of water, as well as, if appropriate, fats and additives, and the corresponding mixture is subject to the thermo-mechanical treatment applied by the extrusion machine in order to be heated and gelled before being shaped in the nozzle. The texturization, otherwise known as fibration, of a food product essentially takes place in the nozzle of the extrusion machine, through which the material coming out of the sleeve of the machine is pushed by the screws of the machine. [In French], the method for preparing food products based on fiberized proteins is known under the name "CEMH" which is the acronym of the French expression "Cuisson-Extrusion en Milieu Humide" [Extrusion-cooking in a humid medium], as well as under the name "HME" which is the acronym of the English expression "High Moisture Extrusion".

WO 03/007729 discloses a HME method and an associated extrusion machine, wherein the nozzle is designed for cooling in a controlled manner the material flowing through, by making the material flow through a channel which has both a great length, typically of several meters, and a rectangular cross-section, a temperature profile being applied along the channel so as to gradually decrease the temperature of the material between the inlet and the outlet of the channel. The material in contact with the cooled wall of the channel tends to adhere to said wall, thereby shearing the laminar flow of material in the channel. The shearing contributes to the development of current lines within the material paste and tends to align denatured macromolecules along the direction of flow. In practice, the shear rate and the flow regime result from the fixed geometry of the channel, so that the control of the fibration requires that the channel and, thereby, the processing time in the nozzle, be long.

In a field different from the field of the invention, namely the extrusion of plastic or rubber, FR 2 213 846 and JP 2002 113764 disclose "crosshead" nozzles, comprising an outer casing inside which an internal component is coaxially arranged, defining a flow channel for the extruded material. The internal component is rotated about the common axis from an upstream part of the internal component, whereas, on the downstream side, the material comes out of the nozzle being shaped into a tubular product. Similarly, WO 2020/144407 discloses a nozzle having an internal part linked in rotation with a rotor of an extruder, while defining, with respect to a fixed external ring of the nozzle, a channel through which the extruded material flows before coming out of the nozzle through radial outlets of the external ring. Insofar as the material flows along a bent path in the different nozzles, the latter are structurally unsuitable for letting through a material rich in protein and water, which, during the extrusion processing thereof, will gradually gel through the appearance and development of long fibers.

SUMMARY OF THE INVENTION

The purpose of the present invention is to propose a novel nozzle for the extrusion of a material rich in proteins and water, which would be less bulky, and more efficient with respect to the fibration of the product coming out of the nozzle.

To this end, the subject matter of the invention is a nozzle for extruding a material rich in protein and water, comprising:

an outer casing which is tubular, centered on an axis, and which is thermoregulated, and an internal component which is arranged coaxially inside the outer casing and which is mounted so as to rotate about the axis with respect to the outer casing, so that:

a downstream part of the internal component extends outside the outer casing and is engaged with a motorization suitable for rotating the internal component about the axis, and a channel is delimited between the outer casing and the internal component, the channel having a cross-section that is annular, centered on the axis, and the channel having an upstream end and a downstream end, which are axially opposed to each other and between which the material flows into the channel, so that when the material is pushed through the nozzle, the material advances through the channel from the upstream end to the downstream end through which the material axially comes out of the channel.

A further subject matter of the invention is an extrusion machine, including:

a sleeve inside which at least one screw is driven so as to apply a thermomechanical treatment to a material rich in protein and water, and a nozzle, which is as defined above and of which the outer casing is linked in a fixed manner to the sleeve so that the material coming out of the sleeve is pushed by the at least one screw through the nozzle.

A further subject matter of the invention is a system for continuous preparation of an extruded food product, comprising:

an extrusion machine as defined above, and a raw material, which is rich in protein and water and to which a thermomechanical treatment is applied after insertion into the sleeve.

One of the ideas underlying the invention is to design an extrusion nozzle which, while providing good heat exchange with the material flowing through, can be used for adjusting the shear rate applied to the flow of the material in the nozzle, by making it possible to use the adjustable shear rate as a control parameter of the nozzle. To this end, the nozzle defines a channel wherein the material let through the nozzle flows, the channel having an annular cross-section and being delimited by the coaxial arrangement of a tubular outer casing and of an internal component. The outer casing is thermoregulated so that the inner face thereof against which the material flows in the channel, can be cooled compared to the temperature of the material, which means the material tends to adhere to the inner face of the outer casing. The heat transfer between the outer casing and the material flowing through the channel is substantial, due to the extended cylindrical contact surface between the material and the inner face of the outer casing. At the same time, the internal component is rotatably mounted about the central axis of the nozzle so that, by rotating the internal component with respect to the outer casing, the material flowing through the channel tends to wrap around the outer face of the internal component. The material flowing through the channel is thus strongly sheared between the cooled inner face of the outer casing and the rotating outer face of the internal component, with a shear rate which is adjustable by changing the speed and/or direction of rotation of the internal component and/or by adjusting the thermoregulation of the outer casing. The nozzle according to the invention thus can be used for obtaining and finely controlling the fibration of the material flowing in the channel and hence the fibration of the product coming out of the nozzle, i.e. of the extruded food product which is continuously prepared by the system according to the invention, while noting that the nozzle is compact, i.e. taking little space in the direction of the central axis thereof.

According to advantageous additional features of the invention:

The outer casing is provided with thermoregulation means suitable for applying a temperature profile along the channel between the upstream end and the downstream end.

The temperature profile applied by the thermoregulation means is intended for cooling the material flowing through the channel as same advances through the channel.

The thermoregulation means are integrated into two distinct modules which succeed one another along the axis, in juxtaposed manner.

The internal component comprises at least two distinct portions which define respective portions of the channel, succeeding one another along the axis, and which can rotate about the axis independently of one another.

The motorization comprises a plurality of motors which are correspondingly specific to each part of the internal component.

The nozzle has an outlet deflector, which is linked in a fixed manner to at least one part of the internal component and which is arranged at the downstream end of the channel so as to exert a counter-pressure against a flow of the material coming out of the channel.

The internal component is equipped with a chopping tool arranged outside the outer casing so as to act on the material coming out of the channel.

The cross-section of the channel is constant between the upstream end and the downstream end of the channel.

The extrusion machine further includes:

an end plate, which is directly mounted in a fixed manner to a downstream end of the sleeve and which internally delimits a through bore, centered on the axis, channeling the material pushed by the at least one screw, and a divergent nozzle, which fixedly links the end plate and the outer casing and which delimits a distribution chamber connecting the through bore of the end plate and the upstream end of the channel, the distribution chamber being shaped so as to distribute the material around the axis in the upstream end of the channel.

BRIEF DESCRIPTION OF THE DRAWINGS

The invention will be better understood upon reading the following description, given only as an example and making reference to the drawings, wherein.

DESCRIPTION OF THE PREFERRED EMBODIMENTS

Figure 1:
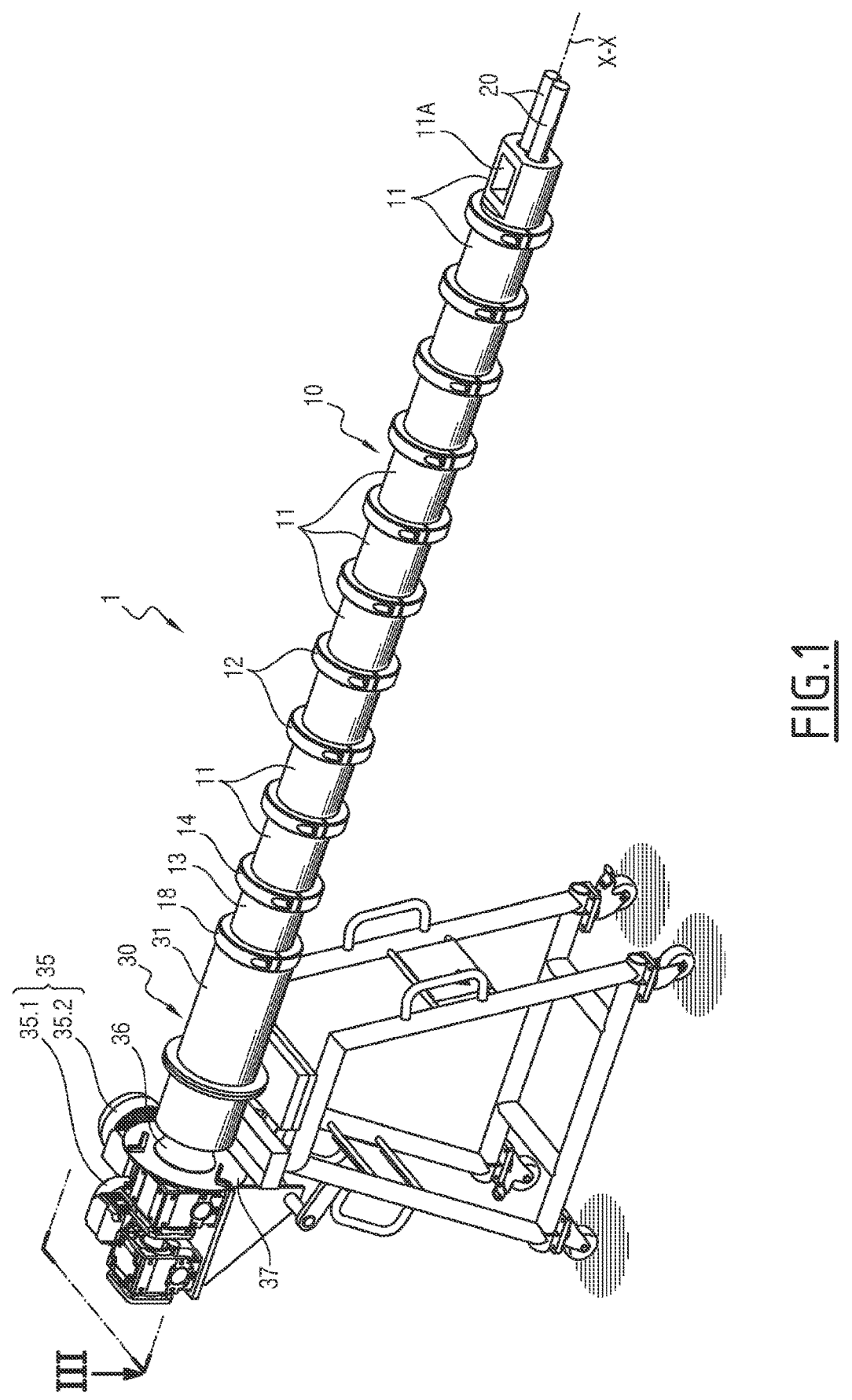
FIG. 1 is a perspective view of an extrusion machine according to the invention.
Figure 2:
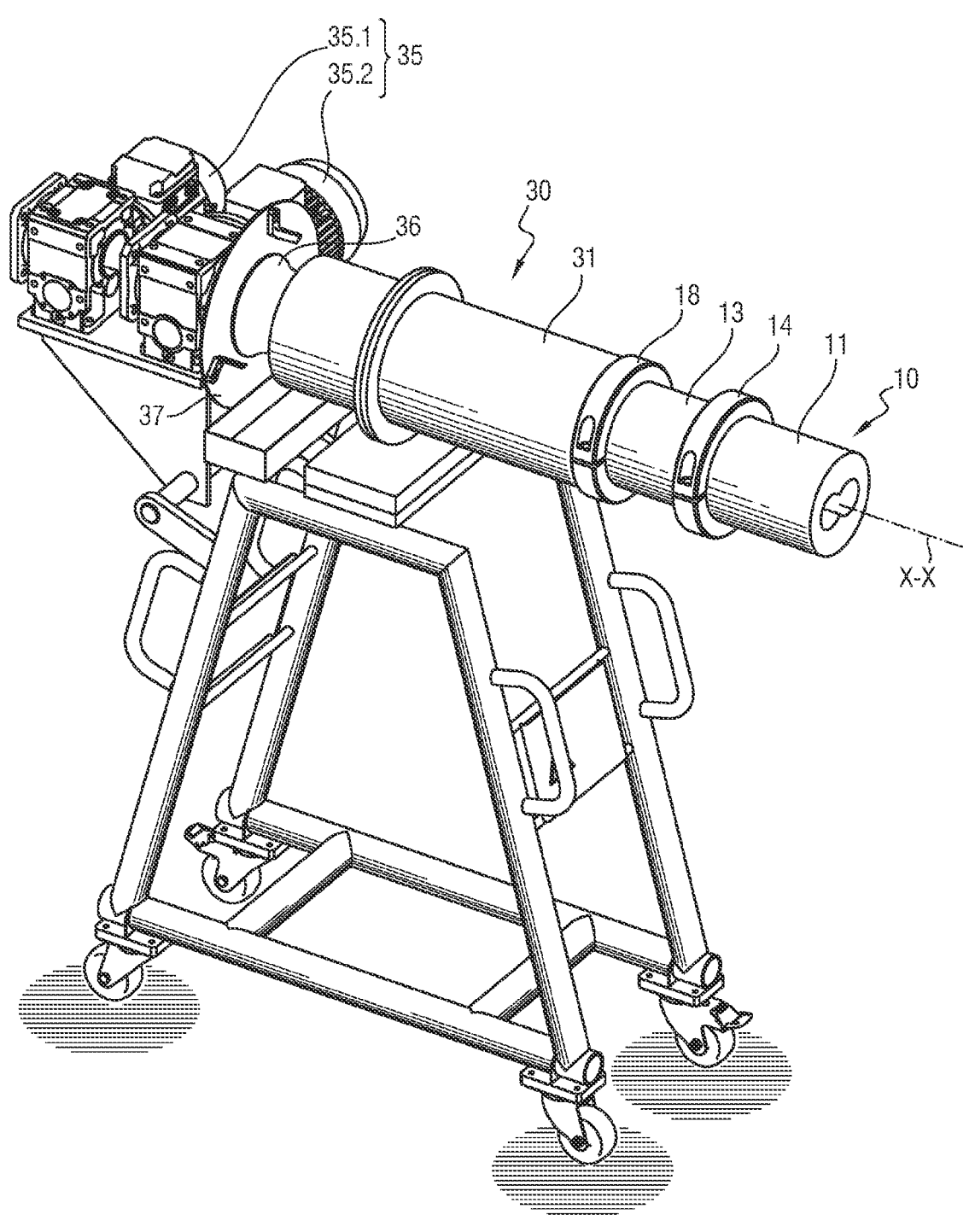
FIG. 2 is a view similar to FIG. 1, showing a part of the extrusion machine shown in FIG. 1, including a nozzle as per the invention.

FIGS. 1 to 5 show, schematically, an extrusion machine 1.

The extrusion machine 1 is designed for performing a food-processing extrusion, by continuously extruding a food product intended for human and/or animal consumption, from a raw material rich in proteins and water.

The extrusion machine 1 is more specifically designed for extruding a material rich in protein and water, by continuously preparing a textured food product, in other words a fiber product. More precisely, the raw material, i.e. all the ingredients which are processed by the extrusion machine 1 to form the food product, and the extruded material, i.e. the material obtained at the outlet of the extrusion machine 1, contains mainly water and proteins, as well as, to a minor or even marginal extent, dietary fiber and/or starch, and possibly fats and additives.

The extruded material thus comprises between 25 and 90% by weight, preferentially between 50 and 85% by weight, of water and also comprises, by weight over the entire dry material, between 20 and 90% of proteins. The proteins are of plant and/or animal origin and/or at least of one other origin. Plant proteins come e.g. from legumes, cereals and/or protein crops (soy, wheat, peas, corn, chickpeas, lentils, etc.). Proteins of animal origin are derived e.g.

from fish, meat, milk and/or eggs. The other origin or origins of proteins are e.g. mushrooms, algae, insects, cellular meat, etc.

The extruded material further comprises, by weight over the total dry matter, between 0 and 50% of dietary fibers and between 0 and 50% of starch, the sum of the dietary fibers and/or starch being greater than 0.01%. Dietary fibers are e.g. fibers of plant origin and starch e.g. is of plant origin, in the native, pre-gelled or modified state.

The extruded material can also comprise between 0 and 20% fats, in particular of plant and/or animal origin, and/or functional ingredients, such as lecithins, caseinates or other ingredients.

The extrusion machine 1 comprises a sleeve 10 with an elongated shape, which extends along a geometric axis X-X and which is centered on the axis. Inside the sleeve 10, two screws 20 extend parallel to the axis X-X, being received in a supplementary longitudinal bore of the sleeve, centered on the axis X-X. In practice, in a manner known per se, each screw includes e.g. a central screw shaft 21 on which a set of screw elements 22 is mounted. The screws extend on both sides of the axis X-X and are interpenetrating, the bore of the sleeve thus having a two-lobed transverse profile, as can be seen clearly in FIG. 2, wherein the screws 20 are omitted.

The screws 20 are designed for being rotated on themselves, about the central axis thereof, by a drive unit, not shown in the figures, engaged with the upstream end of the screws, namely the right-hand end in FIG. 1, emerging outside the sleeve 10.

The screws 20 are designed, due to the threaded profile thereof, for driving the raw material inside the sleeve 10 along the axis X-X, from an upstream part of the sleeve 10, into which the ingredients of the material are introduced inside the central longitudinal bore of the sleeve, as far as the downstream end of the sleeve 10, the terms "upstream" and "downstream" being oriented along the direction of progression of the material inside the sleeve under the action of the screws 20, the direction of progression being from right to left in FIGS. 1 to 4.

The sleeve 10 includes a plurality of modular elements 11 succeeding one another along the axis X-X. Each of the elements 11 internally delimits a corresponding part of the central longitudinal bore of the sleeve 10, the bore parts being in line with one another, along the axis X-X, in the assembled state of the elements 11, as in the figures. In practice, the elements 11 are assembled in pairs by means of fastening collars 12.

In the example of embodiment considered in the figures, the element furthest upstream among the elements 11 can be used for inserting, inside the central bore part thereof, the ingredients of the raw material. To this end, in a manner known per se and not presented in detail herein, the element furthest upstream among the elements 11 is provided with a through hole 11A which, transversely to the axis X-X, opens to the outside the central bore part of said element. More generally, it is understood that, among the different elements 11 of the sleeve 10, one or a plurality of the elements make it possible to insert, inside the central longitudinal bore of the sleeve 10, the solid and/or liquid ingredients of the material to be extruded by the extrusion machine 1.

As mentioned in the introductory part of the present document, the screws 20 are designed, in addition to driving along the material to be extruded, for shearing and pressurizing the material, so as to transform same in an essentially mechanical way. Since such aspect of the extrusion machine 1 is well known in the field, same will not be further discussed herein. Similarly, also as mentioned in the introductory part, the sleeve 10 is designed for regulating the temperature of the material to be extruded along the sleeve so as to transform the material in an essentially thermal way. To this end, all or part of the elements 11 of the sleeve 10 are thermoregulated and/or allow steam to be injected into the sleeve and/or allow the material being extruded into the sleeve to be degassed. Herein again, such aspect of the extrusion machine 1 being well known in the field, it will not be described hereinafter. More generally, the sleeve and the screws 20 are designed for applying a thermomechanical treatment to the raw material as said material advances from the upstream end of the sleeve to the downstream end of the sleeve.

At the downstream end thereof, the sleeve 10 comprises an end plate 13, commonly referred to as the "front plate" in the field. The end plate 13 is directly mounted in a fixed manner, e.g. by means of a fastening collar 14, to the downstream end of the element furthest downstream, among the elements 11 of the sleeve 10. As can be seen clearly in FIGS. 3 and 4, the end plate 13 internally defines a through bore 15 which is centered on the axis X-X, extending along the axial continuation of the central bore, part of the element furthest downstream among the elements 11, and which receives the downstream end of the screws 20. The bore 15 is suitable for channeling the material pushed downstream by the screws 20 so as to provide appropriate pressurization and filling ratio for the central longitudinal bore of the sleeve 10. For this purpose, the bore 15 is e.g. at least partially choked downstream and provided with a transverse grid 16. Since such aspect of the extrusion machine 1 does not limit the scope of the invention, such aspect will not be described hereinafter.

The extrusion machine 1 further comprises a nozzle 30 which, in the assembled state of the extrusion machine 1, is arranged at the downstream end of the sleeve 10. The nozzle 30 is designed for letting through the material processed by the extrusion machine 1 for the purpose of extruding said material. Thereby, in the assembled state of the extrusion machine 1, the material coming out of the sleeve 10 is forced, under the action of the screws 20, to flow through the nozzle 30.

Figure 3:
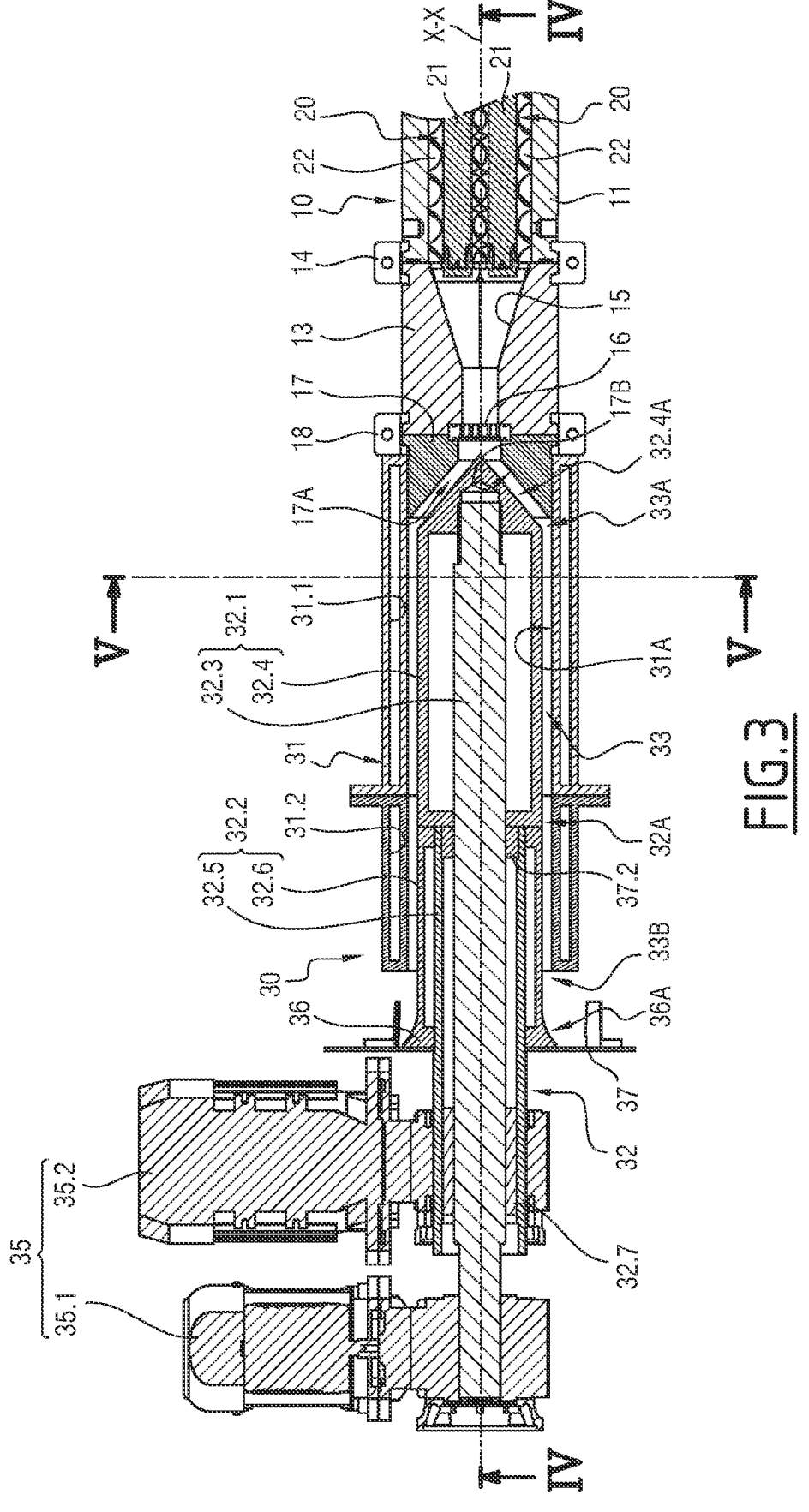
FIG. 3 is a partial schematic longitudinal section of the extrusion machine shown in FIG. 1, in plane Ill of FIG. 1.
Figure 4:
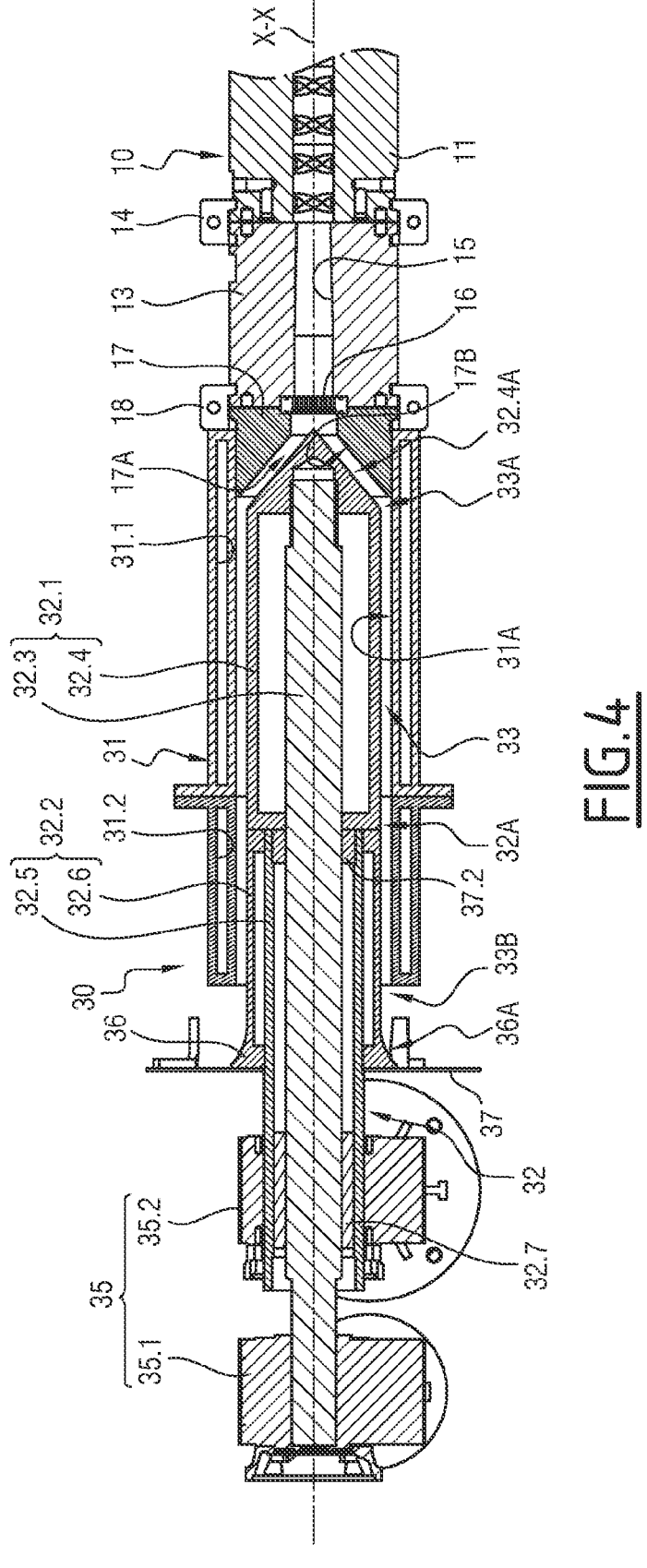
FIG. 4 is a section along the line IV-IV shown in FIG. 3.
Figure 5:
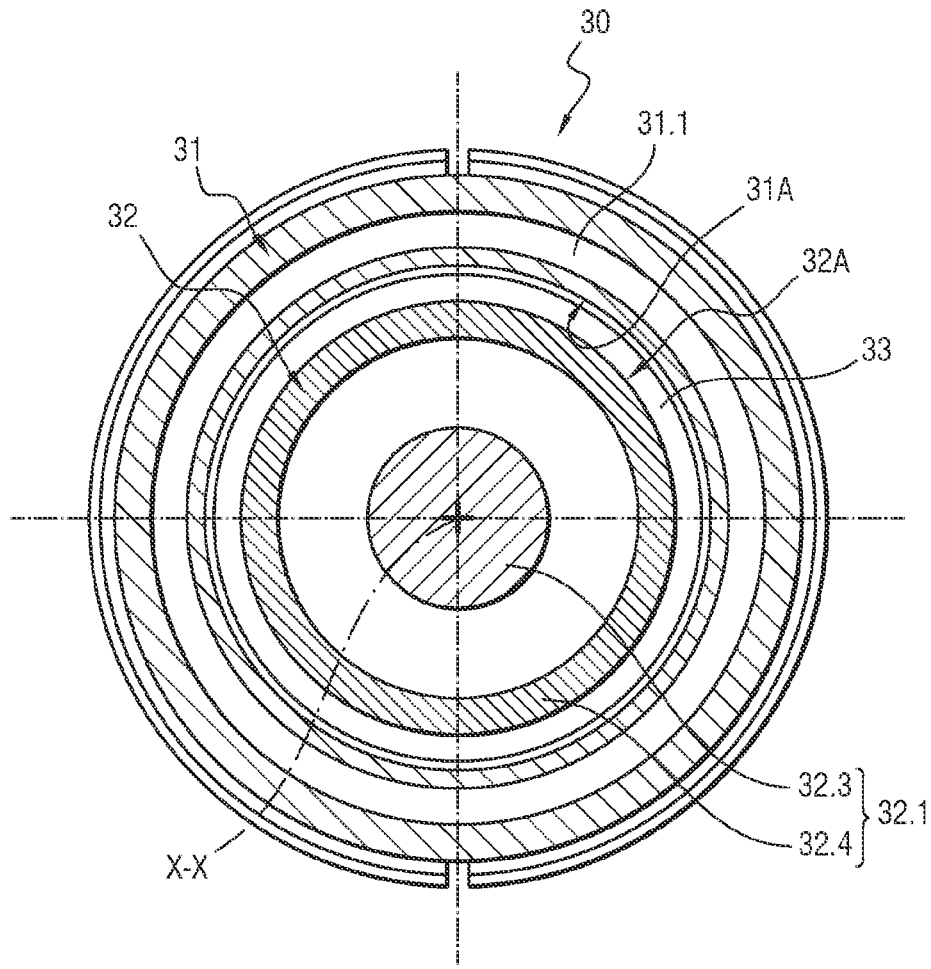
FIG. 5 is a section along the line V-V shown in FIG. 3.

As can be seen clearly in FIGS. 3 to 5, the nozzle 30 mainly includes an outer casing 31 and an internal component 32. The outer casing 31 is tubular, being centered on a geometric axis which, in the assembled state of the extrusion machine 1, coincides with the axis X-X and which will hence be considered thereafter as being the axis X-X. The internal component 32 has an elongated shape, centered on a geometric axis which, in the assembled state of the extrusion machine 1, coincides with the axis X-X and which will hence be considered thereafter as being the axis X-X. The internal component 32 is arranged coaxially inside the outer casing 31, so that, radially between the outer casing 31 and the internal component 32, a channel 33 is delimited, with a transverse cross-section, i.e. a cross-section cut perpendicular to the axis X-X, which is annular and centered on the axis X-X. The channel 33 thus extends along the axis X-X from an upstream end 33A of the channel 33, turned towards the sleeve 10, to a downstream end 33B of the channel, opposite the sleeve 10. As can be seen clearly in FIG. 5, the channel 33 extends continuously around the axis X-X, i.e. over 360°. In service, the material coming from the sleeve 10 and passing through the nozzle 30, flows into the channel 33, advancing therein from the upstream end 33A to the downstream end 33B.

Because of the tubular shape thereof, the outer casing 31 has an inner face 31A, i.e. a face turned towards the axis X-X, which delimits the channel 33, forming the outer periphery thereof, from the upstream end 33A to the downstream end 33B of said channel. The internal component 32 has an outer face 32A, i.e. a face turned opposite from the axis X-X, which delimits the channel 33, forming the inner periphery thereof, from the upstream end 33A to the downstream end 33B of said channel. In the example of embodiment considered in the figures, the inner face 31A of the outer casing 31 and the outer face 32A of the internal component 32 are each cylindrical with circular bases, centered on the axis X-X: as a result, the annular cross-section of the channel 33 is constant from the upstream end 33A a to the downstream end 33B.

The outer casing 31 will now be described in greater detail, before presenting in detail thereafter the internal component 32.

The outer casing 31 is thermoregulated, i.e. is designed for controlling the temperature thereof so as to maintain same, at least locally, at a determined value, advantageously adjustable, in spite of the heat exchanges between the outer casing 31 and the immediate environment thereof. In particular, the outer casing 31 is thus designed for acting on the temperature in the channel 33, more precisely on the material flowing through said channel, by means of heat exchange between said material and the outer casing 31 through the inner face 31A of the outer casing.

For the purpose of thermoregulation, the outer casing 31 includes, in the example of embodiment considered in FIGS. 1 to 5, two conduits 31.1 and 31.2 for the circulation of a thermoregulating fluid, e.g. water under pressure. Each conduit 31.1, 31.2 has an annular shape, centered on the axis X-X, and surrounds the channel 33, being separated from the latter by a heat-conducting wall of the outer casing 31, which supports the inner face 31A. The conduits 31.1 and 31.2 are distinct from one another and follow one another along the axis X-X, the conduit 31.1 surrounding an upstream part of the channel 33, extending from the upstream end 33A to an intermediate axial level of the channel, whereas the conduit 31.2 surrounds a downstream part of the channel 33, extending from the aforementioned intermediate axial level to the downstream end 33B of the channel. In practice, as shown in the figures, the conduits 31.1 and 31.2, respectively, are integrated into separate modules of the outer casing 31, which follow one another along the axis X-X in juxtaposed manner. In operation, each of the conduits 31.1 and 31.2 is fed with a thermoregulating fluid and makes the latter flow overall along the direction of the axis X-X so as to apply a temperature profile along the part of the channel 33 surrounded by the corresponding conduit, in particular so as to cool the material flowing in the channel 33 as the material advances through the channel. Of course, the nozzle 30 includes, for each of the conduits 31.1 and 31.2, a thermoregulating fluid inlet for feeding the conduit from outside the outer casing 31, and a thermoregulating fluid outlet for discharging the thermoregulating fluid towards the outside of the outer casing, the inlet and the outlet of thermoregulating fluid from each conduit not being shown in the figures. Insofar as the conduits 31.1 and 31.2 are distinct, the conduits can advantageously apply respective temperature profiles which are different from each other, e.g. by providing that the material flowing in the channel 33 is cooled more intensely by heat exchange with the thermoregulating fluid flowing in the conduit 31.1 than by heat exchange with the thermoregulating fluid flowing in the conduit 31.2, or vice versa.

Of course, the embodiment which has just been described in connection with the conduits 31.1 and 31.2, is only one possibility of embodiment of, more generally, thermoregulation means for the outer casing 31, suitable for applying a temperature profile along the channel 33 from the upstream end 33A to the downstream end 33B, in particular so as to cool the material flowing in the channel as the material advances through said channel.

Moreover, the outer casing 31 is designed for being connected linked in a fixed manner to the sleeve 10 in the sense that, in the assembled state of the extrusion machine 1, the sleeve 10 and the outer casing 31 are linked to each other in a fixed manner. In practice, the outer casing 31, in particular an upstream part of the latter, is for such purpose rigidly attached, either directly or indirectly, to a downstream part of the sleeve 10, in particular to the end plate 13 of said sleeve.

Thus, according to a possible embodiment which is implemented in the example considered in the figures, the end plate 13 continues, towards the downstream end, by a divergent nozzle 17 which provides the fixed link between the outer casing 31 and the end plate 13. The outer casing 31 e.g. is mechanically rigidly attached, by any appropriate means, to the divergent nozzle 17, the latter being in particular fitted inside the outer casing 31, at the upstream end of the latter, whereas the divergent nozzle 17 is directly mounted pressed against the end plate 13, in the axial continuation of the latter, and is held in a fixed manner against the end plate 13 by means of a fastening collar 18.

Whatever the specificities of the divergent nozzle 17, which allows the fixed connection to be made between the nozzle 30 and the sleeve 10, the divergent nozzle 17 advantageously delimits a distribution chamber 17A for the material flowing to the junction between the sleeve 10 and the nozzle 30. In the assembled state of the extrusion machine 1, the distribution chamber 17A connects the downstream end of the bore 15 of the end plate 13 to the upstream end 33A of the channel 33. The distribution chamber 17A thus makes the material which comes out of the end plate 13 in a centered manner on the axis X-X, flow to the upstream end 33A of the channel 33. For the material entering the upstream end 33A of the channel 33 to be distributed over the entire extent, around the axis X-X, of the upstream end 33A, the distribution chamber 17A is shaped so as to distribute the material around the axis X-X into the upstream end 33A of the channel 33: for this purpose, in the example shown in the figures, the distribution chamber 17A is provided with a frustoconical surface 17B, which is centered on the axis X-X and diverges downstream, linking an upstream end of the distribution chamber 17A to the inner face 31A of the outer casing 31.

Unlike the outer casing 31, the internal component 32 is not intended to be fixed with respect to the sleeve 10 but is intended to rotate about the axis X-X so that, within the nozzle 30, the internal component 32 is mounted apt to rotate about the axis X-X with respect to the outer casing 31. Thereby, the outer face 32A of the internal component 32 rotates about itself about the axis X-X.

According to an advantageous embodiment, which is implemented in the figures, the internal component 32 includes two distinct parts 32.1 and 32.2 delimiting respective parts of the channel 33, which follow one another along the axis X-X. Thereby, the part 32.1 delimits an upstream part of the channel 33, supporting a corresponding part of the outer face 32A of the internal component 32, whereas the part 32.2 delimits a downstream part of the channel 33, immediately adjacent to the aforementioned upstream part of the channel, the part 32.2 supporting the rest of the outer face 32A. Each of the parts 32.1 and 32.2 can rotate independently of the other part, so that the parts 32.1 and 32.2 can rotate about the axis X-X at respective speeds which are different from each other and/or in respective directions which are opposite to each other.

In the example of embodiment considered in the figures, the part 32.1 comprises both a central shaft 32.3, which is centered on the axis X-X and of which an upstream part is arranged inside the outer casing 31 whereas a downstream part of the central shaft 32.3 is located outside the outer casing 31, and a staging part 32.4 which is arranged inside the outer casing 31, being rigidly attached to the upstream part of the central shaft 32.3. The staging part 32.4 delimits the aforementioned upstream part of the channel 33, by supporting a corresponding part of the outer face 32A of the internal component 32. The part 32.2 includes both a tubular shaft 32.5 which is centered on the axis X-X, an upstream part of which is arranged inside the outer casing 31, whereas a downstream part of the tubular shaft 32.5 is arranged outside the outer casing 31, and a staging part 32.6 which is arranged inside the outer casing 31 and which is rigidly attached to the upstream part of the tubular shaft 32.5. The staging part 32.6 delimits the aforementioned downstream part of the channel 33, by supporting a corresponding part of the outer face 32A of the internal component 32. The central shaft 32.3 extends inside the tubular shaft 32.5, with radial interposition of one or a plurality of journal bearings 32.7 between the shafts 32.3 and 32.5, in particular between the respective upstream part thereof and between the respective downstream part thereof. The staging parts 32.4 and 32.6 are immediately adjacent to each other along the axis X-X, with axial interposition, where appropriate, of a decoupling interface between the staging parts, not shown in the figures.

Whatever the embodiment of the internal component 32, the nozzle 30 advantageously comprises a motorization 35, in particular an electric motor, suitable for rotating the internal component 32 about the axis X-X. The invention is not limited to the technical specificities of the motorization 35. In the example of embodiment considered in the figures, the motorization 35 includes two motors 35.1 and 35.2 which are specific to the part 32.1 and to the part 32.2, respectively, of the internal component 32. Thereby, the motor 35.1 is designed for rotating the part 32.1 about the axis X-X. For this purpose, the output of the motor 35.1 is e.g. engaged with the downstream part of the central shaft 32.3. The motor 35.2 is designed for rotating the part 32.2 about the axis X-X. The output of the motor 35.2 is e.g. engaged with the downstream part of the tubular shaft 32.5.

According to a possible arrangement, which is implemented in the figures, the upstream end of the internal component 32 is at least partially arranged in the divergent nozzle 17, delimiting, together with the latter, the distribution chamber 17A. In the example envisaged in the figures, the upstream end of the internal component 32 is formed by the staging piece 32.4 of the part 32.1 of the internal component 32 and has a conical surface 32.4A, centered on the axis X-X and divergent towards the downstream. The conical surface 32.4A matches the frustoconical surface 17B of the divergent nozzle 17, being arranged inside the frustoconical surface 17B so as to provide the distribution chamber 17A between the surfaces 32.4A and 17B.

According to another possible arrangement, also implemented in the embodiment considered in the figures, the nozzle 30 includes an outlet deflector 36 which is linked in a fixed manner to the internal component 32. Thereby, the outlet deflector 36 is, together with the internal component 32, rotatable about the axis X-X with respect to the outer casing 31. The invention is not limited to the embodiment for the fixed connection between the outlet deflector 36 and the internal component 32. In the example embodiment considered in the figures, the outlet deflector 36 is integrated into the staging part 32.6 of the part 32.2 of the internal component 32.

The outlet deflector 36 is arranged at the downstream end 33B of the channel 33 so as to exert a counter-pressure with respect to the flow of the material coming out of the channel 33. In practice, along the axis X-X, the deflector 36 can occupy either exactly the same position as the downstream end 33B of the channel 33 or be slightly offset downstream of the downstream end 33B as in the example envisaged in the figures. In all cases, the outlet deflector 36 is designed to physically interfere, along the direction of the axis X-X, with the material coming out of the channel 33 via the downstream end 33B of the latter. In other words, the outlet deflector 36 induces an axial resistance to the flow of the material coming out of the channel 33. According to a practical embodiment, implemented in the example considered in the figures, the outlet deflector 36 is provided with a substantially frustoconical surface 36A, which is centered on the axis X-X, diverging towards the downstream, and against which flows the material coming out of the channel 33.

The operation of the extrusion machine 1 will now be described.

The ingredients of the raw material to be extruded are introduced into the sleeve via at least one of the elements 11 thereof, then are driven along downstream by the screws 20, while being transformed under the effect of the thermomechanical treatment applied by the sleeve and the screws. The material coming out of the element furthest downstream, among the elements 11 of the sleeve 10, is pushed successively through the end plate 13, the divergent nozzle 17 and the nozzle 30. The material enters the nozzle 30 after having passed through the distribution chamber 17A wherein the material is advantageously distributed about the axis X-X by the divergent nozzle 17. Inside the nozzle 30, the material flows in the channel 33, from the upstream end 33A of the latter to the downstream end 33B thereof. The material comes out of the nozzle 30 by escaping from the downstream end 33B of the channel 33, after having advantageously been held back by counter-pressure under the effect of the outlet deflector 36.

As the material flows along the channel 33, same is sheared by two different shear components which cumulate, namely a first shear component resulting from the adhesion of the material to the inner face 31A of the outer casing 31 due to the cooling applied by the outer casing 31 to the material through the inner face 31A, and a second shear component resulting from the winding of the material around the outer face 32A of the internal component 32 due to the rotation about the axis X-X of the internal component 32 by the motorization 35. Therefrom results a substantial fibration of the material flowing in the channel 33, the fibration being carried out under the double effect of the cooling of the material, controlled by the thermoregulation of the outer casing 31, and of the winding of the flow of material, caused by the rotation of the internal component 32. Thereby, the material coming out of the downstream end of the channel 33 exhibits qualitative and quantitative texturing, even if, because of the limited axial dimension of the channel 33, the processing time thereof in the nozzle 30 is short, in particular compared to existing nozzles used to obtain similar texturing. The extrusion machine 1 can thus be used for continuously preparing, from a raw material, food products of different fibrous structures from an extruded material rich in protein and water.

It is possible to modify the shear rate applied to the material flowing in the channel 33 and hence to modify the characteristics of the fibration by acting on the respective speeds and/or directions of rotation of the parts 32.1 and 32.2 of the internal component 32 and/or by acting on the respective temperature profiles which are applied by means of the conduits 31.1 and 31.2 of the outer casing 31. Thereby, by controlling the thermoregulation performed by the outer casing 31 and/or the rotation of the internal component 32, the nozzle 30 is controllable in the sense that the nozzle can be used for obtaining a food product having various textures, in a controlled and reproducible manner.

Moreover, various fittings and variants of the extrusion machine 1 described up to now, are conceivable. Examples include:

the internal component 32 can be equipped, in the downstream part thereof extending outside the outer casing 31, with a tool for fragmenting the material coming out of the nozzle 30; the nozzle 30 envisaged in the figures includes such a chopping tool, which is referenced by 37 and the specific embodiments of which are not limited to, it being noted only that the chopping tool draws on the rotation of the internal component 32 to act on the material coming out of the channel 33; and/or reversible mechanical coupling means can be provided between a downstream part of the internal component 32, which extends outside the outer casing 31 and which is engaged with the motorization 35, and the rest of the internal component 32; in this way, the downstream part of the internal component 32 can be temporarily disengaged from the rest of the nozzle 30, e.g. for the purpose of cleaning or maintaining the nozzle.

The invention claimed is:

1. A nozzle for extruding a material rich in protein and water, comprising:

an outer casing which is tubular, centered on an axis, and which is thermoregulated, and an internal component which is arranged coaxially inside the outer casing and which is mounted so as to rotate about the axis with respect to the outer casing, so that:

a downstream part of the internal component extends outside the outer casing and is engaged with a motorization suitable for rotating the internal component about the axis, and a channel is delimited between the outer casing and the internal component, the channel having a cross-section that is annular, centered on the axis, and the channel having an upstream end and a downstream end, which are axially opposed to each other and between which the material flows into the channel, so that when the material is pushed through the nozzle, the material advances through the channel from the upstream end to the downstream end through which the material axially comes out of the channel.

2. The nozzle according to claim 1, wherein the outer casing is provided with thermoregulation means suitable for applying a temperature profile along the channel between the upstream end and the downstream end.

3. The nozzle according to claim 2, wherein the temperature profile applied by the thermoregulation means is intended for cooling the material flowing through the channel as same advances through the channel.

4. The nozzle according to claim 2, wherein the thermoregulation means are integrated into two distinct modules which succeed one another along the axis, in juxtaposed manner.

5. The nozzle according to claim 1, wherein the internal component comprises at least two distinct portions which define respective portions of the channel, succeeding one another along the axis, and which can rotate about the axis independently of one another.

6. The nozzle according to claim 5, wherein the motorization comprises a plurality of motors which are correspondingly specific to each part of the internal component.

7. The nozzle according to claim 1, wherein the nozzle has an outlet deflector, which is linked in a fixed manner to at least one part of the internal component and which is arranged at the downstream end of the channel so as to exert a counter-pressure against a flow of the material coming out of the channel.

8. The nozzle according to claim 1, wherein the internal component is equipped with a chopping tool arranged outside the outer casing so as to act on the material coming out of the channel.

9. The nozzle according to claim 1, wherein the cross-section of the channel is constant between the upstream end and the downstream end of the channel.

10. An extrusion machine, including:

a sleeve inside which at least one screw is driven so as to apply a thermomechanical treatment to a material rich in protein and water, and a nozzle, which is according to claim 1 and of which the outer casing is linked in a fixed manner to the sleeve so that the material coming out of the sleeve is pushed by the at least one screw through the nozzle.

11. The extrusion machine according to claim 10, wherein the extrusion machine further includes:

an end plate, which is directly mounted in a fixed manner to a downstream end of the sleeve and which internally delimits a through bore, centered on the axis, channeling the material pushed by the at least one screw, and a divergent nozzle, which fixedly links the end plate and the outer casing and which delimits a distribution chamber connecting the through bore of the end plate and the upstream end of the channel, the distribution chamber being shaped so as to distribute the material around the axis in the upstream end of the channel.

12. A system for continuous preparation of an extruded food product, comprising:

an extrusion machine according to claim 10, and a raw material, which is rich in protein and water and to which a thermomechanical treatment is applied after insertion into the sleeve.

13. The nozzle according to claim 3, wherein the thermoregulation means are integrated into two distinct modules which succeed one another along the axis, in juxtaposed manner.

14. The nozzle according to claim 2, wherein the internal component comprises at least two distinct portions which define respective portions of the channel, succeeding one another along the axis, and which can rotate about the axis independently of one another.

15. The nozzle according to claim 3, wherein the internal component comprises at least two distinct portions which define respective portions of the channel, succeeding one another along the axis, and which can rotate about the axis independently of one another.

16. The nozzle according to claim 4, wherein the internal component comprises at least two distinct portions which define respective portions of the channel, succeeding one another along the axis, and which can rotate about the axis independently of one another.

17. The nozzle according to claim 2, wherein the nozzle has an outlet deflector, which is linked in a fixed manner to at least one part of the internal component and which is arranged at the downstream end of the channel so as to exert a counter-pressure against a flow of the material coming out of the channel.

18. The nozzle according to claim 3, wherein the nozzle has an outlet deflector, which is linked in a fixed manner to at least one part of the internal component and which is arranged at the downstream end of the channel so as to exert a counter-pressure against a flow of the material coming out of the channel.

19. The nozzle according to claim 4, wherein the nozzle has an outlet deflector, which is linked in a fixed manner to at least one part of the internal component and which is arranged at the downstream end of the channel so as to exert a counter-pressure against a flow of the material coming out of the channel.

20. The nozzle according to claim 5, wherein the nozzle has an outlet deflector, which is linked in a fixed manner to at least one part of the internal component and which is arranged at the downstream end of the channel so as to exert a counter-pressure against a flow of the material coming out of the channel.

* * * * *